June 1, 1926.
W. ALLEN
SAW LEVELING MACHINE
Filed Oct. 17, 1925    2 Sheets-Sheet 1
1,587,357
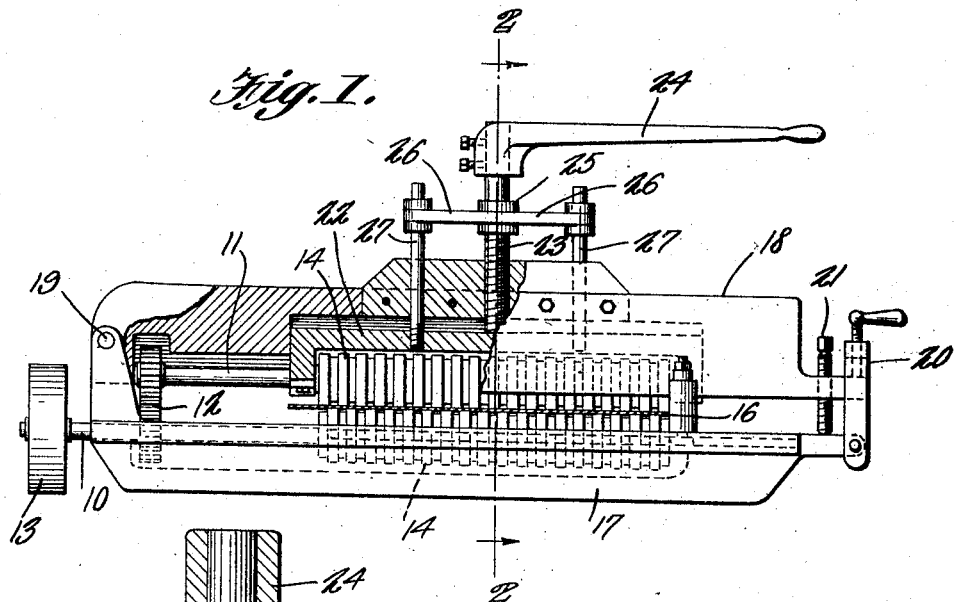
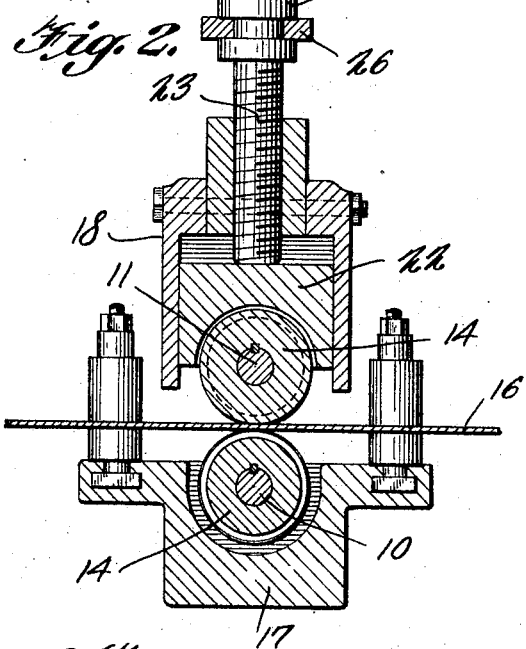
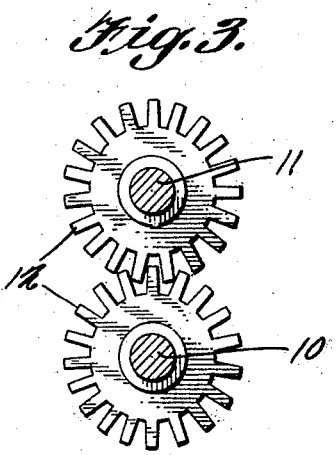
William Allen, INVENTOR
BY Victor J. Evans ATTORNEY
WITNESS:

June 1, 1926.
W. ALLEN
SAW LEVELING MACHINE
Filed Oct. 17, 1925
1,587,357
2 Sheets-Sheet 2
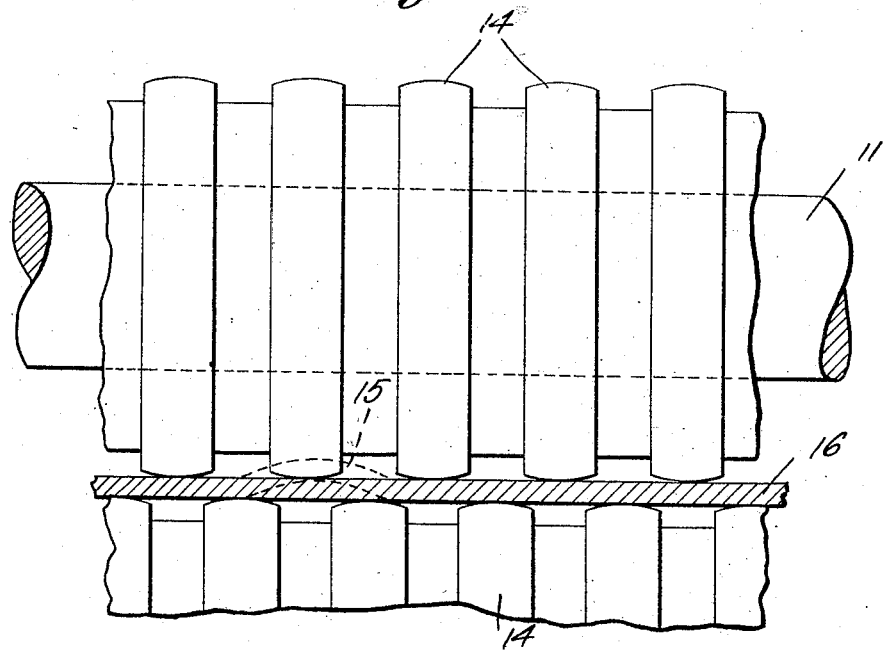
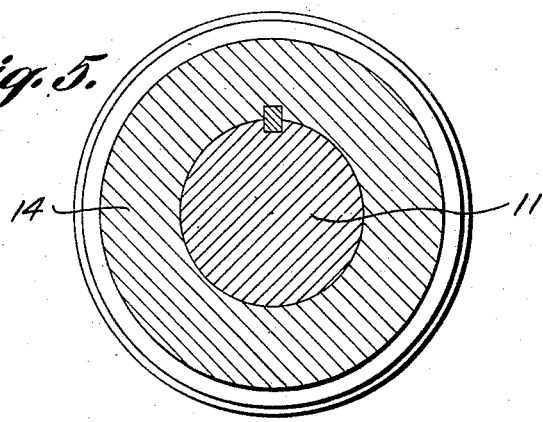
William Allen, INVENTOR
BY Victor J. Evans ATTORNEY Patented June 1, 1926.

1,587,357

UNITED STATES PATENT OFFICE.

WILLIAM ALLEN, OF WILSON, MISSISSIPPI, ASSIGNOR OF ONE-HALF TO JOHN E. JONES, OF WILSON, MISSISSIPPI.

SAW-LEVELING MACHINE.

Application filed October 17, 1925. Serial No. 63,129.

This invention contemplates the provision of a device for removing crimps or the like from band saws, and thus accomplish this duty in a quicker and less laborious manner than by the usual custom of hammering the saw, which is not only a slow method, but one which frequently injures the saw and materially lessens its life.

More specifically stated, the invention contemplates the use of spaced series of rolls, with the rolls of one series staggered with relation to the rolls of the other series, so that as the saw band passes between the respective series, the ridges, crimps or other irregularities are pressed out, thus providing the saw band with perfectly flat sides.

The nature and advantages of the invention will be better understood when the following detailed description is read in connection with the accompanying drawing, the invention residing in the construction, combination and arrangement of parts as claimed.

In the drawing forming part of this application, like numerals of reference indicate similar parts in the several views, and wherein:

Figure 1 is a view in elevation and partly in section of the device forming the subject matter of the present invention.

Figure 2 is a sectional view on line 2—2 of Figure 1.

Figure 3 is a view of the gearing.

Figure 4 is an enlarged fragmentary view of the rolls of the respective series showing the saw band in section and arranged between said series.

Figure 5 is a sectional view showing how the rolls are mounted upon a shaft.

The device forming the subject matter of the present invention essentially embodies a pair of spaced parallel shafts 10 and 11 respectively, and carried by these shafts adjacent their ends are gears 12. The shaft 10 is adapted to be rotated by any suitable power, and is equipped with a belt pulley 13 for this purpose, and inasmuch as the gears 12 of said shafts mesh with each other, it is manifest that the shaft 10 is rotated from the shaft 11 with the same speed. Keyed or otherwise suitably secured to each shaft is a series of spaced rolls 14, each roll being provided with a convexed periphery, while it will be noted that the rolls of one series is arranged in staggered relation with the rolls of the other series, so that when the band saw is passed between the respective series of rolls, the crimps, ridges and other irregularities in the band will be pressed out, to provide the saw band with perfectly flat sides. This operation is clearly illustrated in Figure 4, wherein 15 represents a crimp in the saw band 16, and as one of the rolls of the uppermost series is brought in contact with this crimped portion 15, it will depress the latter, and thus flatten or straighten the saw at this point. The crimped portion 15 is, of course, depressed by the pressure exerted thereon by the adjacent roll, and this can be easily and quickly accomplished inasmuch as the crimped portion has no resistance from any of the rolls of the other series, due to the staggered relation of the rolls above mentioned. The elasticity of the band saw will cause the slight depression caused by the roll to spring upwardly to the level, and inasmuch as this process deals with both sides of the saw at the same time, the saw band can be quickly and conveniently relieved of its irregularities without injury to the saw. The respective series of rolls only exert sufficient pressure upon the saw band to cause the saw to travel between said rolls, and therefore does not have any effect upon the band so as to in any way stretch the latter. It will not in any way alter the temper of the saw band steel, and it will relieve the saw band of all ridges and irregularities, irrespective of what direction they run on the saw. Furthermore, the steel is not in any way injured or deformed while passing between the rolls, so that the latter do not in any way detract from the life or elasticity of the saw band.

The shafts 10 and 11 are arranged one above the other, and may be mounted on any suitable frame for the purpose intended, but I preferably make use of a supporting structure of the character illustrated in the drawing. This frame consists of a relatively stationary part 17 and a relatively movable part 18, the latter being pivoted as at 19 upon the stationary part as shown in Figure 1. The shaft 10 is journaled in the stationary part while the shaft 11 is journaled in the movable part, which, of course, allows the latter mentioned part and the shaft 11 to be spaced a sufficient distance from the shaft 10 when it is desired to place the saw band between the respective series of rolls for the purpose above mentioned. When the movable part 18 of the frame has been lowered to the position shown in Figure 1, it is held in this position by means of a suitable clamp indicated generally at 20, a stop pin or screw 21 being carried by the part 18 and adapted to contact the stationary part 17 to hold said rolls properly spaced. The shaft 11 is journaled in a carriage or support 22 which forms part of the movable section 18 of the frame, but susceptible of independent movement with relation thereto, so that the shaft 11 may be slightly adjusted with relation to the shaft 10 to vary the pressure exerted upon the saw band, as will be readily understood. This adjustment is accomplished by the use of a screw 23 threaded through the movable part 18 of the frame and having its lower end bearing against the adjustable carriage 22, the screw being adjusted through the instrumentality of a suitable lever 24. Loosely mounted upon the screw 23 is a collar 25 from which projects arms 26, each of the latter having an opening to receive one of the guide pins 27 arising from the carriage 22 and slidable through the openings in the movable section 18 of the frame. It is manifest that I have devised a means whereby a saw band can be easily positioned between the rolls of the respective series, and fed through said rolls to relieve the saw band of ridges or other irregularities with a minimum of time and effort.

While it is believed that from the foregoing description the nature and advantages of the invention will be readily apparent, I desire to have it understood that I do not limit myself to what is herein shown and described, and that such changes may be resorted to when desired as fall within the scope of what is claimed.

Having thus described the invention, what is claimed as new, is:—

1. A device of the character described comprising a frame-like supporting structure including a stationary section, and a movable section pivoted at one end upon the stationary section and adapted to lie parallel therewith, a shaft journaled in each section with said shafts arranged one above the other, a series of spaced rolls carried by each shaft, with the rolls of one shaft arranged in staggered relation with the rolls of the other shaft, a yoke-like clamp for holding the respective sections of the supporting structure parallel, and means carried by the movable section for spacing the latter the desired distance from the stationary section for the purpose specified.

2. A device of the character described comprising a frame-like structure including a stationary section, and a movable section pivoted at one end upon the stationary section, said movable section having a longitudinally disposed recess, a carriage slidably arranged in said recess, a shaft journaled in the stationary section, a second shaft journaled in said carriage, means for adjusting said carriage to move the shaft thereon toward and away from the first mentioned shaft, and a series of spaced rollers carried by each shaft, with the rolls on one shaft arranged in staggered relation with the rolls of the other shaft.

3. A device of the character described comprising a frame-like structure including a stationary section, and a movable section pivoted on one end of the stationary section, a shaft journaled in the stationary section, said movable section having a recess longitudinally thereof, a carriage slidably mounted in said recess, a shaft journaled in said carriage and arranged above the first mentioned shaft, gears carried by corresponding ends of said shafts and meshing with each other, a threaded element carried by the movable section and associated with said carriage to adjust the latter, guide pins on which said carriage moves, and a lever for operating said threaded element.

In testimony whereof I affix my signature.

WILLIAM ALLEN.